United States Patent [19]

Lelong

[11] Patent Number: 4,629,894

[45] Date of Patent: Dec. 16, 1986

[54] DEVICE FOR MEASURING NUCLEAR RADIATION, AND GAMMA OR SCINTILLATION CAMERA COMPRISING SUCH A DEVICE

[75] Inventor: Pierre H. Lelong, Paris, France

[73] Assignee: U.S. Philips Corporation, New York, N.Y.

[21] Appl. No.: 649,321

[22] Filed: Sep. 10, 1984

[30] Foreign Application Priority Data

Sep. 16, 1983 [FR] France ................. 83 14773

[51] Int. Cl.⁴ .............................................. G01T 1/20
[52] U.S. Cl. .................................. 250/363 R; 250/369
[58] Field of Search ....................... 250/363 R, 369; 328/109, 110, 114, 132, 129.1; 307/518, 517

[56] References Cited

U.S. PATENT DOCUMENTS

| | | | |
|---|---|---|---|
| 3,525,047 | 8/1970 | Schwartz | 250/369 |
| 3,541,311 | 11/1970 | Yuglor | 250/361 |
| 3,752,988 | 8/1973 | Culver | 250/363 |
| 3,984,689 | 10/1976 | Arseneau | 250/369 |
| 4,152,596 | 5/1979 | Marshall, III | 250/358.1 |

*Primary Examiner*—Alfred E. Smith
*Assistant Examiner*—Richard Hanig
*Attorney, Agent, or Firm*—Paul R. Miller

[57] ABSTRACT

A device for measuring nuclear radiation which comprises a scintillator (10) for the detection of the radiation quanta which is optically coupled to an entrance window of a photodetector (20) for converting the scintillations produced by the radiation into current pulses. The device comprises a digital circuit which is connected to a sampling and analog-to-digital conversion circuit (40) and which is used to determine the energy of each non-superposed radiation quantum; when the radiation quanta produce partly superposed current pulses, this circuit determines the energy content of the individual radiation quanta by extrapolations and corrections, notably by means of a memory (170 and/or 180) in which the correction coefficients are stored for performing extrapolations and corrections under the control of a sequencer (200) as initiated by a pulse edge detector (80) which detects the incidence of a radiation quantum.

11 Claims, 11 Drawing Figures

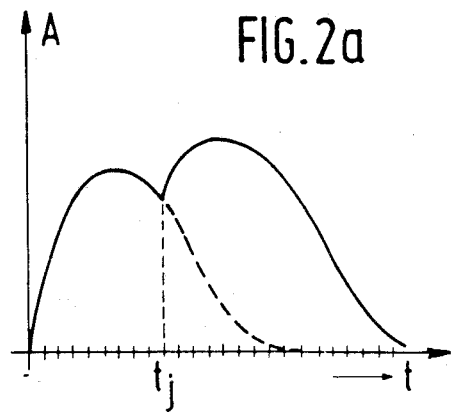
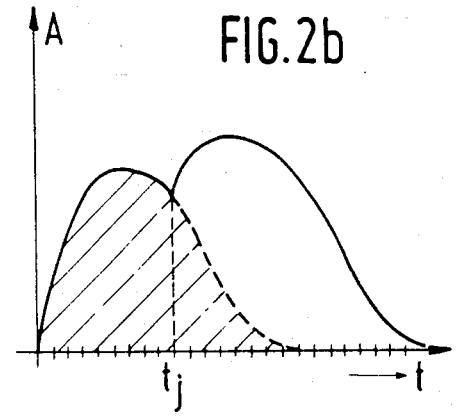
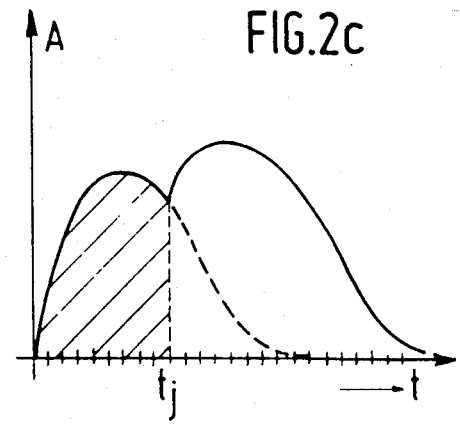
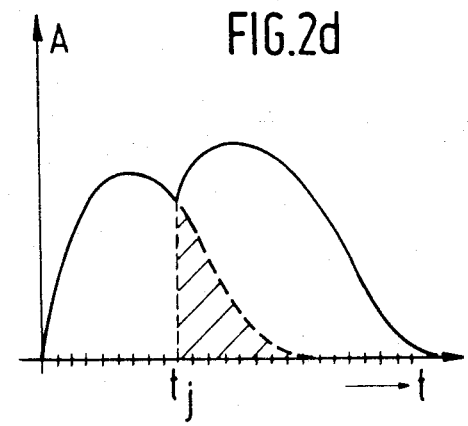
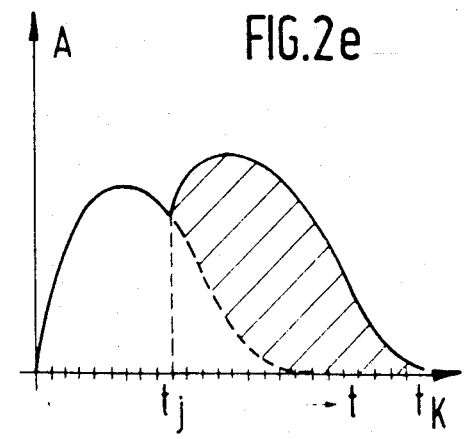
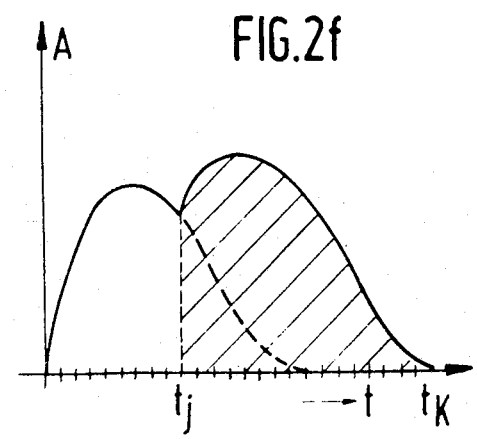

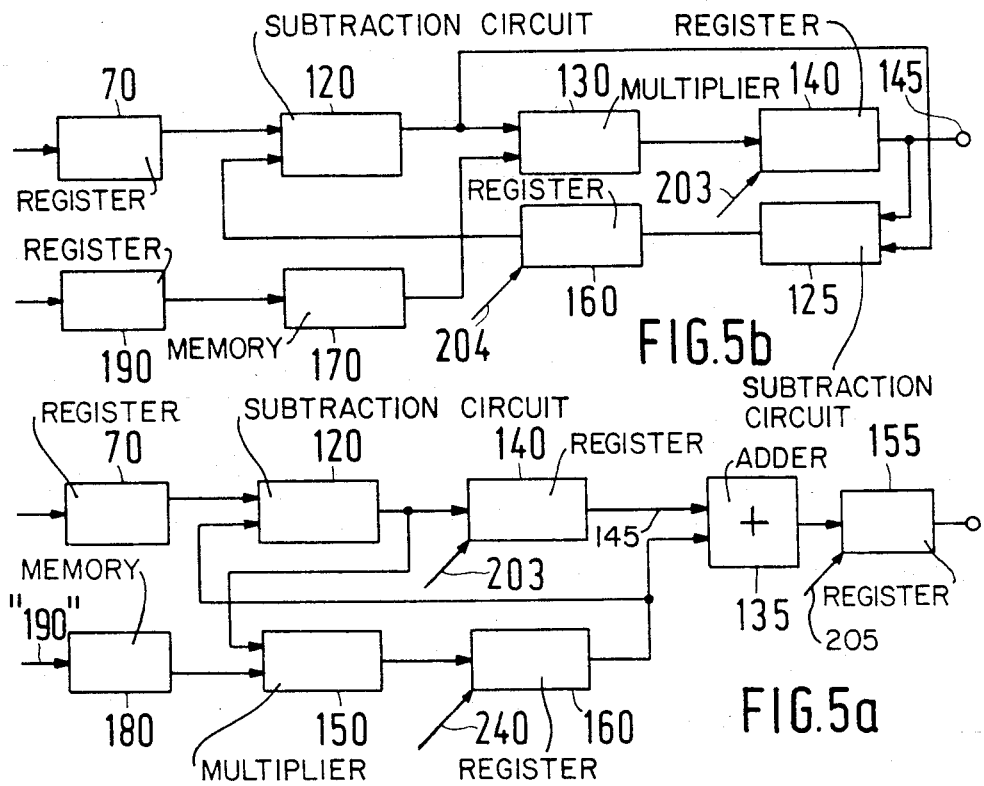

DEVICE FOR MEASURING NUCLEAR RADIATION, AND GAMMA OR SCINTILLATION CAMERA COMPRISING SUCH A DEVICE

The invention relates to a device for measuring nuclear radiation, and also to a gamma or scintillation camera comprising such a device.

U.S. Pat. No. 3,525,047 describes a radiation measuring device which comprises mainly a scintillator for the detection of nuclear radiation, said scintillator being optically coupled to the entrance window of a photodetector (such as a photomultiplier tube) in order to convert the scintillations produced by the nuclear radiation into a current. The device furthermore comprises a current amplifier for amplifying the current, and a pulse discrimination circuit. This pulse discrimination circuit itself comprises means for forming, using a measured parameter which is representative of the output signal of the current amplifier, a signal which is referred to as a facsimile signal and which corresponds to the detection of a single radiation quantum, means for synchronizing the actual output signal of the current amplifier with the facsimile signal and for subtracting said two signals, and finally means for analyzing the residual signal resulting from said subtraction operation in order to deduce the composition of the actual output signal of the current amplifier therefrom. When the analysis thus performed indicates that this output signal is composed of more than two superposed signals, each of which corresponds to the detection of a single radiation quantum, the use of a similar pulse discrimination circuit can ensure (formation of a facsimile signal, synchronization of this signal with the output signal of the current amplifier, subtraction, etc) that an improved detection and counting precision will be achieved for example by applying the residual signal to a further pulse discrimination circuit which is identical to the circuit used to perform the first discrimination.

The proposed device for the measurement of nuclear radiation, however, has several drawbacks which are
 (a) inherent of its operating principle before any discrimination operation on the detected signals, the facsimile signal must be generated as a reference for the subtraction operation;
 (b) the analysis of the residual signal, generally implying the use of a threshold circuit, may prove to be sensitive to interference noise and inaccurate.

It is the object of the invention to propose a device for measuring nuclear radiation whose operation does not require a facsimile signal and which does not have said drawbacks.

To this end, the invention relates to a device for measuring nuclear radiation which comprises a scintillator for the detection of radiation quanta which is optically coupled to a photo-detector for converting the scintillations produced by the radiation quanta into current pulses and which also comprises a pulse discrimination circuit for the processing of the current pulses, characterized in that the pulse discrimination circuit comprises pulse edge detection means for the detection of leading edge of a current pulse, integration means for integrating the current pulses as a function of time, time measuring means for measuring a period of time between a leading edge and a subsequent leading edge of a next pulse, said integration and time measuring means receiving control signals which are derived at least from the detection of a leading edge of a current pulse, storage means for the storage of correction factors which can be selected by way of the measurement value of the integration period t, arithmetic means for determining from the correction factor and from the current pulse integrated over the period t : (a) an extrapolated value of the current pulse integrated over the period t, said extrapolated value being a measure of the time integral of the entire current pulse; (b) a correction value which corresponds to the integrated value of the current pulse after the period t; and also storage means for the storage of the correction value, the arithmetic means determining the difference between the correction value and a directly subsequent current pulse, integrated over the time, in order to determine an extrapolated value and a correction value from the difference thus obtained and from the integration period used for said directly subsequent current pulse.

An embodiment in accordance with the invention will be described in detail hereinafter with reference to the accompanying drawings.

FIG. 1, consisting of the FIGS. 1A and 1B, shows an embodiment of the device for measuring radiation in accordance with the invention;

FIGS. 2a to 2f show the partial superposition of the electrical signals corresponding to two successive radiations which are situated near one another, and also show the intermediate steps of the arithmetic operation performed by the device in accordance with the invention;

FIGS. 3a to 3h show time diagrams which illustrate the chronological sequence of the operation to be performed by the device in accordance with the invention, depending on the various situations which may occur, FIG. 4 is a detailed representation of an embodiment of a pulse sequencer of a device in accordance with the invention, and FIGS. 5a and 5b show further embodiments of a part of the device in accordance with the invention.

The device for measuring radiation as shown in FIGS. 1A and 1B comprises a scintillator 10 for the detection of gamma radiation, said scintillator converting each photon received into scintillations and being optically coupled to an entrance window of a photodetector in the form of a photomultiplier tube 20. This detector converts each scintillation into an electrical current which is amplified by a preamplifier and filter circuit 30. The circuit 30 thus adapts the level of the signal received, a minor filtering operation also being performed in order to smooth the signal. The circuit 30 is connected in series with a sampling and analog-to-digital converting circuit 40 and with an adder 50 whereto a first storage register 60 is connected. The output of the storage register 60 is fed back to a second input of the adder 50. A second storage register 70 is connected to the output of the adder 50. The analog-to-digital converter 40 and the adder 50 receive clock signals from a clock pulse generator 90.

Using the analog-to-digital converter 40, the adder 50 and the storage register 60, a progressive determination of the energy relating to each radiation quantum is performed by cumulative addition of the digitized signal samples. The clock pulse generator, operating independently in this case, may also be activated, for example by a control pulse from the pulse edge detector 80 (the connection denoted by broken lines between the circuits 80 and 90 indicates this second possibility). The pulse edge detector 80 is in this case connected to the output of the preamplifier and filter circuit 30. The clock pulse generator 90 forms the periodic clock signals to be applied to the analog-to-digital converter 40 and also provides synchronization of the analog-to-digital converter 40 and the register 60. The clock signals of the clock pulse generator 90 are also applied to a counter 100 whose count is applied to a test circuit or comparator 110 whose output is connected to a so-called sequencer 200. When the count of the counter (representing the number of signal samples taken) becomes equal to a preselected reference number, the test circuit 110, which may be a simple comparator, applies a control pulse to a so-called pulse sequencer 200.

The number of signal samples taken, corresponding to the reference number chosen, is preferably chosen so that the amplitude signal of the last signal sample taken does not exceed a given (very small) fraction of the maximum amplitude of the current pulse. The pulse sequencer 200 applies a control pulse to the register 70 and to a counter register 190 in which the content of the counter 50 and that of the counter 100 are stored, respectively, after which a further control pulse from the pulse sequencer 200 resets the register 60 and the counter 100 to zero in order to make the device available for the measurement of a radiation quantum to be subsequently intercepted by the scintillation crystal 10.

The content of the register 70 is applied to a first input of the subtraction circuit 120 which in this case receives a zero signal on its second input (this will be explained in detail hereinafter). The output signal of the register 70 is applied to the first input of a multiplier 130, the output signal of which is applied to an extrapolation value register 140; a multiplication signal present on the second input of this multiplier is equal to 1 in the present case (this will be explained in detail hereinafter). After multiplication of the content of the register 70 by the multiplication signal, the register 140 (controlled by the pulse sequencer 200) transfers the multiplication stored therein to the output of the device which thus outputs a signal which is proportional to the energy of a single detected radiation quantum. The result is transferred to the output 145 only after a delay $\tau_1$ with respect to the activation of the registers 70 and 190 in order to take into account the transit and calculation times of the circuits preceding the extrapolation value register 140.

However, when a second radiation quantum is incident on the scintillation crystal 10 before the number of signal samples taken into account has reached the reference number, the measured energy does not (substantially) equal to the energy of the detected radiation quantum, and a (partial) superposition of the electrical signals generated by the first and the second radiation quantum occurs (see FIG. 2a). The operation of the device is then as follows:

(a) The pulse edge detector 80 which is formed, for example by a series connection of a differentiator and a threshold circuit the incidence of the first radiation quantum on the scintillator 10 and also the incidence of a second radiation quantum at the instant $t_j$. The current pulse produced by the second radiation quantum is (partly) superposed on the first current pulse, but the pulse edge of the second current pulse is detected by the pulse edge detector 80. As soon as the leading edge of the second pulse is detected the content of the counter 100 and the output signal of the adder 50 are stored in the counter register 190 and the second register 70, respectively, in order to be applied to the outputs of the registers 190 and 70 (the number of signal sampled summed until the instant $t_j$ equals $n_j$). Subsequently, the register 60 and the counter 100 are immediately reset to zero so that as from the instant $t_j$ they are available again for the summing of the signal samples in cooperation with the adder 50 and the counting of the next number of signals samples to be summed, respectively.

(b) The content of the register 70 is a measure of the energy of the first radiation quantum (shaded area in FIG. 2b). On the basis of this content which is present on the output of the register 70, the amount of energy of the first radiation quantum is determined by extrapolation; this is possible because the response curve of the scintillation crystal after the incidence of a radiation quantum is known. The extrapolation can be performed by a single multiplication. In the multiplier 130 the output signal of the register 70 (shaded area in FIG. 2c) is multiplied by an extrapolation coefficients $C_{nj}$ which is larger than 1, The extrapolation coefficients are stored in a memory 170 and are addressed by way of the value $n_j$ whereby the memory is addressed (the substraction circuit 120 does not influence this extrapolation, because the second negative input thereof receives a zero signal in this case).

(c). The extrapolation result is stored in the extrapolation value register 140 and becomes available on the output 145. A period $\tau_1$ expires between the storage of the data in the registers 70 and 190 and the instant at which the extrapolation result becomes available on the output 145. (d) During said extrapolation, a memory 180 whose address inputs are connected to the output of the register 190, parallel to those of the memory 170, supplies a correction coefficient $C'_{nj}$ which is multiplied by a multiplier 150 by the content of the register 70 (shaded area in FIG. 2c) in order to determine the amount of energy which corresponds to the shaded area in FIG. 2d, which is sampled and summed together with the energy of the second current pulse, and which is associated with the first current pulse.

(e) The correction value corresponding to this energy is stored in a correction value register 160 which is activated only at a time interval $\tau_2$ after the storage of the data in the register 140. The output signal of the register 160 is applied to the second negative input of the subtraction circuit 120.

(f) The energy corresponding to the second radiation quantum (shaded area in FIG. 2e) is determined by means of the subtraction circuit 120 by subtracting the signal which is stored in the correction value register 160 and which corresponds to the shaded area in FIG. 2d from the output signal of the second register 70 (at the instant $t_k$, shaded area in FIG. 2f).

This is because the sampled and summed signal between the instants $t_j$ and $t_k$ is a signal produced by the superposition of two current pulses, it being possible to derive the residual amount of energy of the first current pulse (between the instants $t_j$ and $t_k$) from the amount of energy measured until the instant $t_j$. The signal thus obtained is multiplied by the output signal of the memory 170 which in this case supplies an extrapolation coefficient which is equal to 1, because no new radiation quantum whatsoever disturbs the measurement of the preceding quantum. The extrapolation coefficient is larger than 1 if a third radiation quantum occurs before the counter 100 reaches the position stored in the comparator 110. When this counter position is reached, the determination of the energy content of a current pulse has been completed. The result of the multiplication performed by the multiplier 130 is stored in the register 140 under the same conditions as previously described. As has already been described, the electrical current pulses which have been generated by each time a radiation quantum and which were partly superposed have now been discriminated, taking into account the speed of succession of the incident radiation quanta. When a new radiation quantum occurs, the determination process is systematically performed again in an identical manner.

The FIGS. 3a to 3h illustrate the chronological sequence of the operations performed by the described device.

FIG. 3a shows the clock signal which is supplied by the clock circuit 90 which determines the sampling rate of the analog-to-digital converter 40.

FIG. 3b shows the situation where a single radiation quantum is detected. As soon as a so-called final sum signal appears on the output of the comparator 110 and indicates that a sufficient number of signal samples has been taken and summed, the content of the adder 50 (the accumulated signal samples) can be stored in the second register 70 due to the appearance of the signal (1) in FIG. 3a (like the content of the counter 100 in the counter register 190). The signal shown in FIG. 3b produces the signal (1) in FIG. 3c which itself produces the signal (1) of FIG. 3f whereby the register 60 and the counter 100 are reset to zero.

FIG. 3c shows the case where two radiation quanta are incident in such a rapid succession that the current pulses produced thereby are partly superposed. The successive signals which are shown in FIG. 3c and which indicate the detection (by the detector 80) of the radiation quanta are plotted on a broken time axis t. The first signal 2-1 terminates the signal (1) in FIG. 3f whereby the register 60 and the counter 100 have been reset to and retained in the zero position. The signal (1) in FIG. 3f is always present after the comparator 110 has given an indication that a current pulse has been completely sampled and integrated. After the signal (2-1) in FIG. 3c, a first current pulse is sampled and integrated until a second radiation quantum is incident (signal (2-2)) which generates a current pulse which is (partly) superposed on the first current pulse. In conjunction with the signal (2) shown in FIG. 3e, the signal (2-2) ensures the storage of the content of the adder 50 in the register 70, after which the register 60 and the counter 100 are reset to zero by the signal (2) in FIG. 3f. Because the signal (2) in FIG. 3f decreases directly to zero, the energy of the superposed current pulses can be sampled and integrated. This sampling and integration operation is interrupted either by the incidence of a third radiation quantum (causing a partial superposition on the second current pulse) so that the control signal (e) is again applied to the registers 70 and 190 and the register 60 and the counter 100 are reset to zero again by the signal f, or when a sufficient number of signal samples of the second current pulse, generated by the second radiation quantum, has been reached.

FIG. 3d shows the logic state of a signal d in the circuit of FIG. 4 which will be described in detail hereinafter.

FIGS. 3e and 3f show the control pulses which control the registers 70 and 190, respectively, and the control pulses which control the resetting to zero of the register 60 and the counter 100 in the case (1) of a single radiation quantum and in the case (2) where two radiation quanta are incident in rapid succession.

Figure 4:
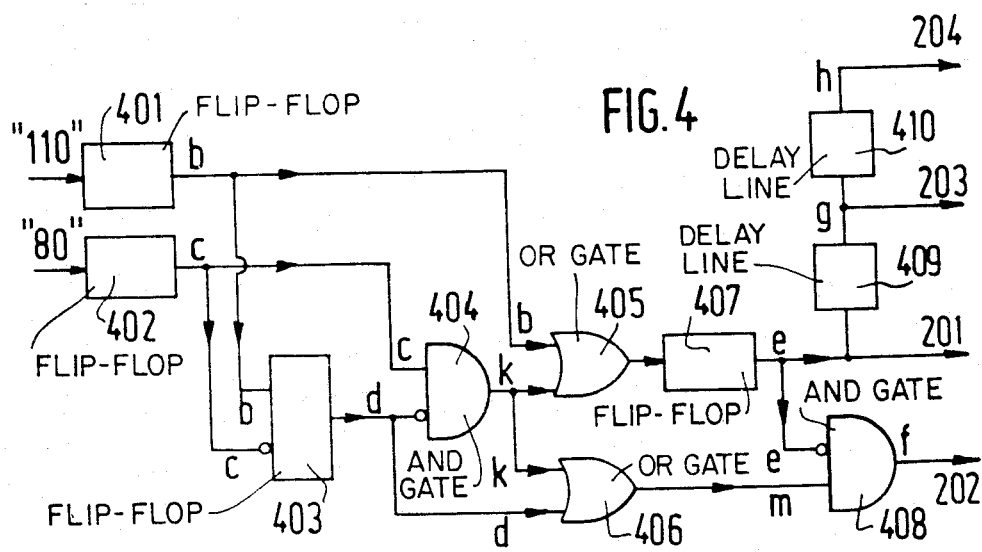

In the embodiment shown in FIG. 4, the pulse sequencer 200 which generates the various control signals described with reference to the FIGS. 3a to 3h comprises three monostable flip-flops 401, 402 and 407, an RS-type flip-flop 403, two AND-gates 404 and 408, two OR-gates 405 and 406, and two delay lines 409 and 410. It can be deduced that his circuit results in the described operation: the monostable flip-flop 401 receives the output signal of the comparator 110. The monostable flip-flop 402 receives the output signal of the pulse edge detector 80. The output b of the monostable flip-flop 401 assumes the logic value 1 when a final sum signal is present which is outputted after the changing over of the test circuit 110. When the logic value on the output c of the monostable flip-flop 402 equals 0, the logic value 1 occurs at d, 0 occurs at k, 1 occurs at e (signal of FIG. 3e), and 1 occurs at m. As soon as e assumes the logic value 0 again, f changes to 1 (resetting to zero of the counter 100 and the register 60) and remains 1 for as long as d is 1, whilst g and h follow the logic value of e with delays of $\tau_1$ and $\tau_1+\tau_2$, respectively.

When the output b of the monostable flip-flop 401 has the logic value 0, c having the logic value 1 (arrival of a first radiation quantum), d becomes 0 as soon as c assumes the logic value 0, k remains 0 and e, g, h are 0.

As soon as e assumes the logic value 1 again (arrival of a second radiation quantum, b still not having assumed the value 1 because the counter 100 has not yet reached the counter position stored in the comparator 110), k becomes 1 and e, m, g, h also become 1, f becoming 1 (resetting of the register 60 and the counter 100 to zero) only when e becomes 0 again. The logic value of f becomes 0 when m, that is to say k, and hence c, returns to 0.

Figure 1A:
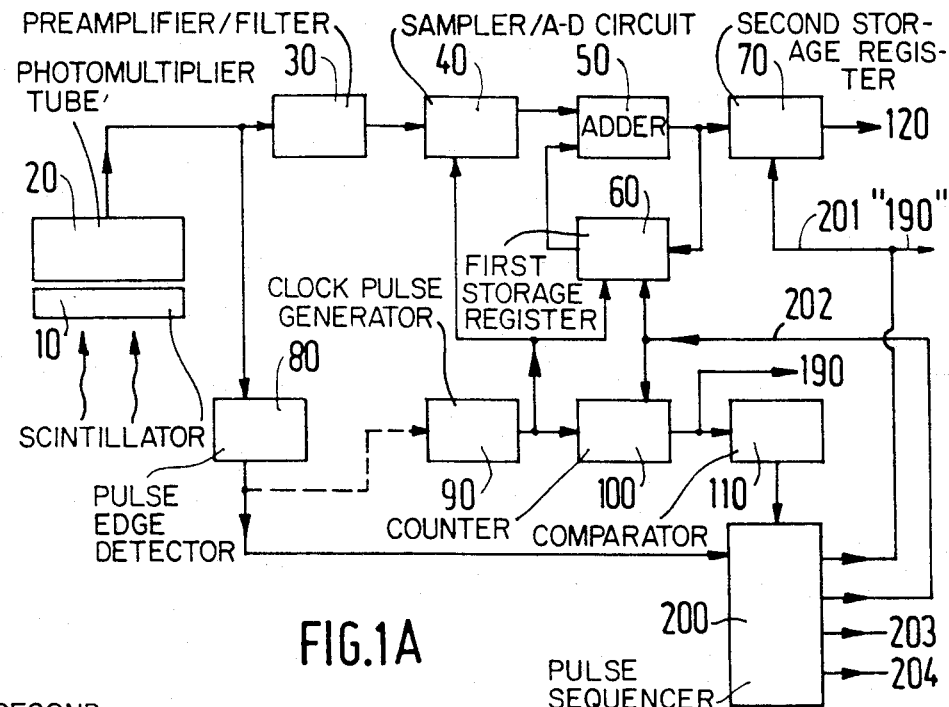
Figure 1B:
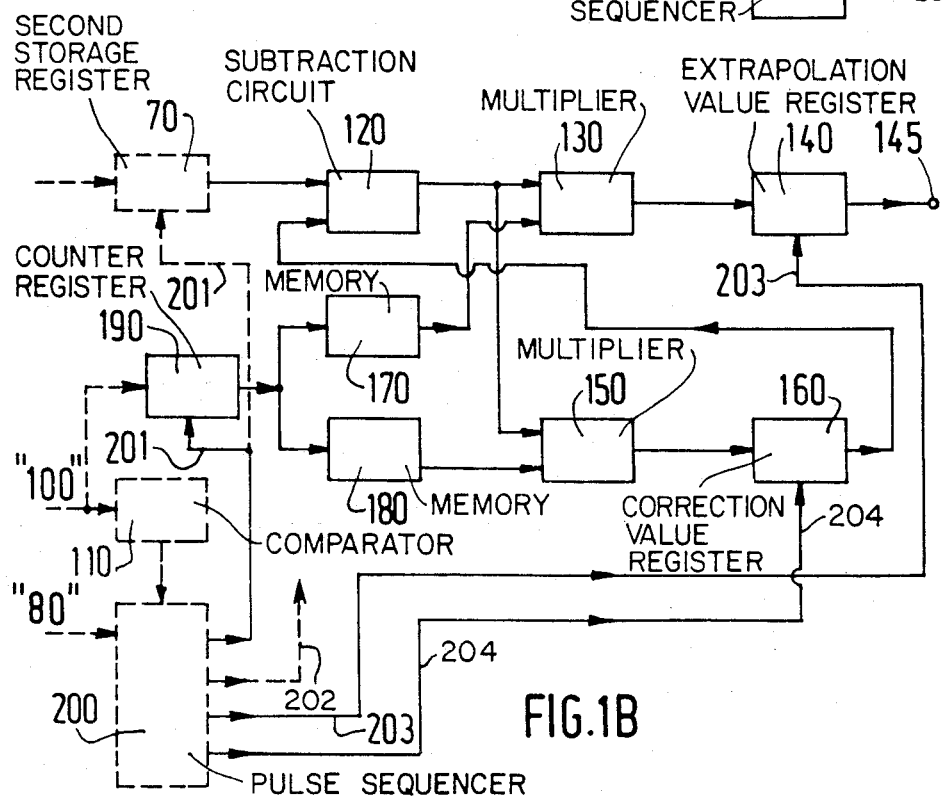
Figure 3:
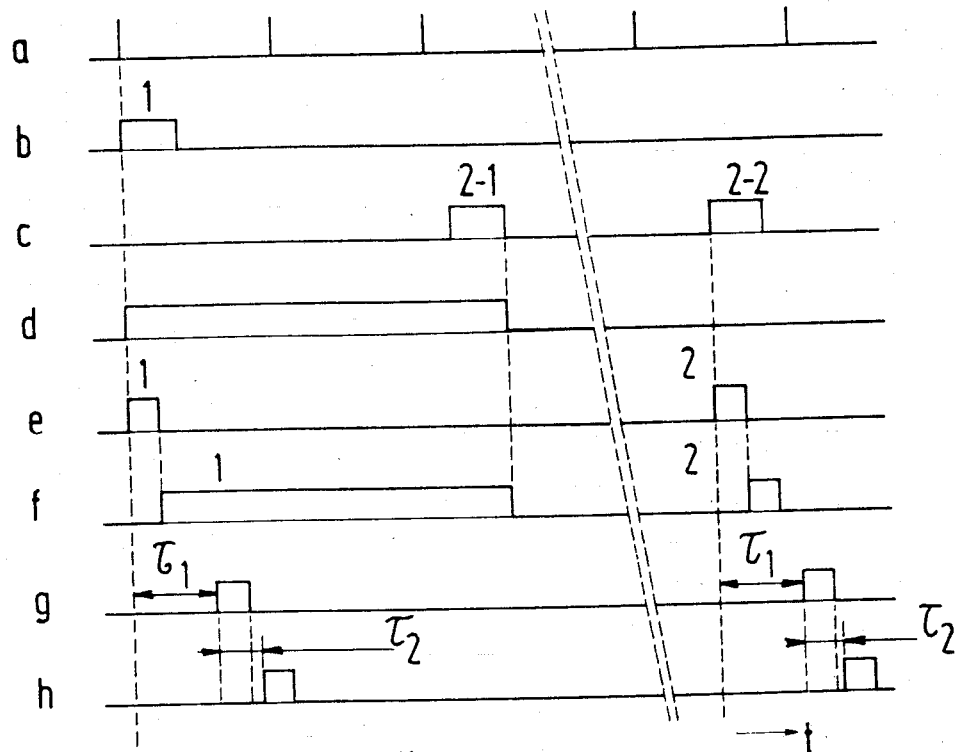
FIG. 3g shows the signal which controls the extrapolation value register 140 at the output of the device in accordance with the invention and which appears a time interval $\tau_1$ after the signals of FIG. 3e.
FIG. 3h shows the signal which controls the correction value register 160; this signal appears only a time interval $\tau_2$ after the signal of FIG. 3g.

The device shown in the FIG. 1A and 1B can be modified in several ways within the scope of the present invention. For example, the digital integration means 40, 50, 60 can be replaced by an analog integrator which is connected in series with an analog-to-digital converter whose output is to be connected to the input of the register 70. The analog-to-digital converter must receive a control signal (for example, the control signal on line 201), the register 70 being activated in a delayed manner with respect to the activation of the analog-to-digital converter. Because an analog integrator has a discharge time and because the current pulses are liable to overlap so that no time is available for discharging, it is useful to connect two analog integrators in parallel. As a result of the parallel connection, one integrator can integrate (charge) whilst the other can discharge (after having been sampled by the analog-to-digital converter which should always be switched from one integrator to the other integrator, for example under the control of the signal on the line 201).

Furthermore, as is shown in FIG. 5a, it is possible to use only one memory (180) and one multiplier (150). The memory 170 and multiplier 130 (FIG. 1B) may be omitted when the output of the subtraction circuit 120 is connected to the input of the register 140 and a first input of the adder circuit 135 is connected to the output 145. A second input of the adder circuit is connected to the output of the register 160, so that the falling amount of energy (FIG. 2d) which is stored in the register 160 is added to the amount of energy already present in the register 140. The result of a measurement is thus obtained a period $\tau_3$ (calculated time of the adder) after the instant at which the content of the register 160 (signal h on line 204, see FIG. 3h and FIG. 4) has become available. The result of the adder may be stored in a register 155 which is connected thereto and which should receive a control signal 205 for this purpose, said control signal being derived, for example from the signal (h) on line 204 (for example, via a delay element such as the elements 409 and 410 in FIG. 4) after a delay $\tau_3$.

FIG. 5b shows another possibility of using only one memory (170) and one multiplier (13); this can be achieved by omitting the memory 180 and the multiplier 150 (see FIG. 1B) and by connecting the outputs of the register 140 and the subtraction circuit 120 to an input of an additional subtraction circuit 125. The output of the subtraction circuit 125 supplies a correction value as shown in FIG. 2d which is applied to the input of the register 160 in order to correct the integrated value of the subsequent (superposed) current pulses. In comparison with the previous example, the present example offers the advantage that no control signals other than the control signals described with reference to the FIGS. 3a to h and FIG. 4 are required.

Although the described embodiments and the pulse sequencer 200 (FIG. 4) are constructed as discrete circuits, they can alternatively be realized completely or partly by means of a microprocessor (notably the pulse sequencer), provided that this microprocessor is sufficiently fast (capable of performing multiplications within 100 ns).

It will be apparent that the present invention is not restricted to the embodiments described with reference to the Figures; on the basis thereof many alternatives are feasible within the scope of the present invention. For example, it is to be noted that when the pulse edge detector 80 is connected between the circuits 20 and 30 as shown in FIG. 1, it can be provided with a filter element but that such a filter element is no longer required when the detector is connected between the circuits 30 and 40.

What is claimed is:

1. A device for measuring nuclear radiation which comprises a scintillator for detecting of radiation quanta which is optically coupled to a photo-detector for converting the scintillations produced by the radiation quanta into current pulses, and which also comprises a pulse discrimination circuit for the processing of the current pulses, characterized in that the pulse discrimination circuit comprises pulse edge detection means for the detection of a leading edge of a current pulse, integration means for integrating the current pulses as a function of time, time measuring means for measuring a period of time t between a leading edge and a subsequent leading edge of a next pulse, said integration and time measuring means receiving control signals which are derived at least from the detection of a leading edge of a current pulse, storage means for the storage of correction factors which can be selected by way of the measurement value of the integration period t, arithmetic means for determining from the correction factor and from the current pulse integrated over the period t:
   (a) an extrapolated value of the current pulse integrated over the period t, said extrapolated value being a measure of the time integral of the entire current pulse;
   (b) a correction value which corresponds to the integrated value of the current pulse after the period t; and also storage means for the storage of the correction value, the arithmetic means determining the difference between the correction value and a directly subsequent current pulse, integrated over the time, in order to determine an extrapolated value and a correction value from the difference thus obtained and from the integration period used for said directly subsequent current pulse.

2. A device as claimed in claim 1, characterized in that the time measuring means comprise a clock pulse generator, an adder, comparator and a counter register, either the comparator generating a stop pulse when the counter reaches a position which corresponds to the counter position preset in the comparator of the counter position being stored in the counter register when the pulse edge detection means detect a leading edge of a current pulse, the counter being reset to zero in both cases.

3. A device as claimed in claim 1 or 2, characterized in that the integration means comprise: an analog-to-digital converter, an adder and a first register, the output of the analog-to-digital converter being connected to a first input of an adder circuit, the output of which is connected to the input of the first register, the output of which is connected to a second input of the adder circuit, the output of the adder being connected to an input of a second register for the storage of the integrated current pulse at the end of the period t.

4. A device as claimed in claim 2, characterized in that the arithmetic means comprise subtraction means for subtracting the correction value from the current pulse integrated over the period t and multiplier means for multiplying the difference supplied by the subtraction means by a correction factor supplied by the storage means.

5. A device as claimed in claim 4, characterized in that the subtraction means comprise a subtraction circuit, a first input of which is connected to the output of the integration means, the multiplier means comprising a multiplier circuit, a first input of which is connected to the output of the subtraction circuit and a second input of which is connected to an output of the storage means, the address input of which is connected to the output of the counter register, the second input of the subtraction circuit receiving the correction value.

6. A device as claimed in claim 5, characterized in that the multiplier circuit supplies the correction value, an output of the multiplier circuit being connected to an input of a correction value register, the output of which is connected to the second input of the subtraction circuit.

7. A device as claimed in claim 6, characterized in that the arithmetic means comprise an adder circuit, a first input of which is connected to the output of the correction value register and a second input of which is connected to an output of an intermediate register, the input of which is connected to the output of the subtraction circuit, the output of said adder circuit supplying the extrapolated value.

8. A device as claimed in claim 6, characterized in that the output of the subtraction circuit is connected to a first input of a second multiplier circuit which forms part of the arithmetic means and a second input of which is connected to an output of an extrapolation coefficient memory which forms part of the storage means and an address input of which is connected to the counter register, the output of said second multiplier circuit supplying the extrapolated value.

9. A device as claimed in claim 5, characterized in that the multiplier circuit supplies the extrapolated value, the output of the multiplier circuit being connected to the input of an extrapolation value register, an output of which is connected to an input of a second subtraction circuit, a second input of which is connected to the output of the first subtraction circuit, the output of the second subtraction circuit being connected to an input of a correction value register whose output is connected to the second input of the first subtraction circuit.

10. A device as claimed in claim 7, characterized in that the pulse discrimination circuit comprises a pulse sequencer, a first input of which is connected to the output of the comparator and a second input of which is connected to the output of the pulse edge detection means, said pulse sequencer successively generating four control pulses on four different outputs in response to an input signal on one of the two inputs, a first control signal being applied to a control input of the counter register and the second register in order to store the counter position and the time integral of the detected current pulse, respectively in said registers, a second control pulse being applied to a reset input of the counter and of the first register, a third control pulse being applied to a control input of either the intermediate register or the extrapolation value register, and a forth control pulse being applied to the correction value register.

11. A gamma camera comprising a device as claimed in claim 1, characterized in that the gamma camera comprises several radiation detectors.

* * * * *